United States Patent
Tiemon et al.

(10) Patent No.: US 11,542,820 B2
(45) Date of Patent: Jan. 3, 2023

(54) TURBOMACHINERY BLADE AND METHOD OF FABRICATING

(71) Applicant: General Electric Company, Schenectady, NY (US)

(72) Inventors: Jorg Arrien Tiemon, Evendale, OH (US); Charles Stanley Orkiszewski, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/832,859

(22) Filed: Dec. 6, 2017

(65) Prior Publication Data

US 2019/0169992 A1    Jun. 6, 2019

(51) Int. Cl.
*F01D 5/14* (2006.01)
*F01D 21/04* (2006.01)

(52) U.S. Cl.
CPC .......... *F01D 5/147* (2013.01); *F01D 21/045* (2013.01); *F05D 2220/36* (2013.01); *F05D 2260/30* (2013.01)

(58) Field of Classification Search
CPC ... F01D 5/12; F01D 5/14; F01D 5/147; F05D 2260/30
See application file for complete search history.

(56) References Cited

U.S. PATENT DOCUMENTS

| | | | |
|---|---|---|---|
| 2,930,580 A | 3/1960 | Hayes | |
| 3,014,693 A | 12/1961 | Horne | |
| 3,660,882 A | 5/1972 | Widowitz et al. | |
| 3,694,104 A * | 9/1972 | Erwin | F01D 5/282 416/217 |
| 4,142,836 A | 3/1979 | Glenn | |
| 5,340,280 A * | 8/1994 | Schilling | F01D 5/282 416/229 A |
| 6,471,485 B1 | 10/2002 | Rossmann et al. | |
| 7,258,530 B2 * | 8/2007 | Morrison | F01D 5/147 29/889.71 |
| 7,780,410 B2 | 8/2010 | Kray et al. | |
| 8,142,163 B1 | 3/2012 | Davies | |
| 8,251,664 B2 * | 8/2012 | Schreiber | F01D 5/282 416/191 |
| 8,398,374 B2 | 3/2013 | Roberts et al. | |
| 8,485,787 B2 * | 7/2013 | Marra | B21C 23/085 416/233 |
| 8,511,999 B1 | 8/2013 | Kimmel et al. | |
| 8,740,571 B2 * | 6/2014 | Garcia-Crespo | F01D 5/147 416/230 |
| 8,858,159 B2 * | 10/2014 | Piggush | F01D 5/187 415/115 |
| 8,911,213 B2 | 12/2014 | Brandl et al. | |

(Continued)

*Primary Examiner* — Courtney D Heinle
*Assistant Examiner* — Sang K Kim
(74) *Attorney, Agent, or Firm* — Dority & Manning, P.A.

(57) ABSTRACT

The present invention is directed to a turbomachinery blade and a method of fabricating the turbomachinery blade. The turbomachinery blade comprises a plurality of blade segments, and the plurality of the blade segments are separate from one another at least partially in an axial direction forming radial seams between adjacent blade segments. The method comprises forming a plurality of blade segments which are separate from one another at least partially in an axial direction; and forming radial seams between adjacent blade segments.

13 Claims, 11 Drawing Sheets

(56) References Cited

U.S. PATENT DOCUMENTS

| | | | |
|---|---|---|---|
| 2010/0080687 A1* | 4/2010 | Vance | F01D 5/147 |
| | | | 415/115 |
| 2012/0070308 A1* | 3/2012 | Naik | F01D 5/20 |
| | | | 416/97 R |
| 2015/0198173 A1* | 7/2015 | Weisse | F04D 19/002 |
| | | | 416/229 R |
| 2016/0222978 A1* | 8/2016 | Drozdenko | F01D 5/282 |
| 2016/0245098 A1* | 8/2016 | Roberge | F04D 29/321 |
| 2019/0338650 A1* | 11/2019 | Henderkott | F01D 5/187 |

* cited by examiner

TURBOMACHINERY BLADE AND METHOD OF FABRICATING

BACKGROUND OF THE INVENTION

The subject matter disclosed herein relates generally to turbomachinery and, more particularly, to turbomachinery blades, and methods of fabricating the turbomachinery blades.

Turbomachinery transfers energy between a rotor and a fluid, including both turbines and compressors. For example, FIG. 1 illustrates a schematic view of a kind of turbomachinery, a turbofan engine 100 disposed about a central axis 126, which including a fan assembly 114 and a core engine 102 including a booster 112, a high-pressure compressor 104, a combustor 106, a high-pressure turbine 108, and a low-pressure turbine 110, and the fan assembly 114 includes an array of fan blades extending radially outward from a rotor disk 116. The turbofan engine 100 has an intake side 118 and an exhaust side 120. The fan assembly 114 and the low-pressure turbine 110 are coupled together using a first rotor shaft 122, and the high-pressure compressor 104 and the high-pressure turbine 108 are coupled together using a second rotor shaft 124. The fan assembly 114 and the core engine 102 are at least partially positioned within an engine casing 128.

Operational loads or a foreign object strike (for example, a bird strike) may cause release of turbomachinery blades, resulting in a Fan blade-out (FBO) event. As seen in FIG. 2, a rotor assembly 200 (for example, a fan assembly) comprises an array of blades 202 and a casing 204, and a released blade has been impacted by operational loads or a foreign object strike and is separated into two pieces; a free portion 206 of the release blade is then impacting a trailing blade 208; finally, the trailing blade 208 is separated into two pieces, caused by the impact of the free portion of the released blade 206. Due to the released blade and the damaged trailing blade(s), undesired rotor unbalance is generated.

During a FBO event, a casing requires containment capability to prevent the blades from breaking through the casing. In the aspect, the Federal Aviation Regulations (FARs) part 33 section 94 of "Blade containment and rotor unbalance tests" formulated by the Federal Aviation Administration (FAA) defines a certification test (FBO test), specifying failures of a compressor blade, a fan blade and a turbine blade, which must occur at the outermost retention groove or, for integrally-bladed rotor disks, at least 80 percent of the blade must fail.

A conventional blade design introduces features to break up the released blade into smaller fragments, but this type of design does not actually reduce a size of the FBO unbalance. Alternatively, a fuse zone can be introduced into the rotor supporting structure to limit the magnitude of structural loads produced by the FBO event, but again, this type of design does not actually reduce the size of the FBO unbalance.

Among others, it would be desirable to provide a turbomachinery blade with a reduced FBO size and methods to fabricate the turbomachinery blade.

SUMMARY OF THE INVENTION

At least one beneficial solution is provided by the present disclosure to include example embodiments, provided for illustrative teaching and not meant to be limiting.

Some example turbomachinery blades according to at least some aspects of the present disclosure may comprise a plurality of blade segments, and the plurality of the blade segments are separate from one another at least partially in an axial direction forming radial seams between adjacent blade segments.

Some example fan assemblies according to at least some aspects of the present disclosure may comprise a fan casing, and a plurality of fan blades spaced apart from one another circumferentially. Each of the plurality of the fan blades comprises a plurality of blade segments, and the plurality of the blade segments are separate from one another at least partially in an axial direction forming radial seams between adjacent blade segments.

Some example rotor assembly according to at least some aspects of the present disclosure may comprise a rotor disk including a circumferential array of slots; and an array of blades each having an axial root engaged in one of the slots of the rotor disk, wherein each of the array of blades comprises a plurality of blade segments, and the plurality of the blade segments are separate from one another at least partially in an axial direction forming radial seams between adjacent blade segments.

Some example turbomachinery according to at least some aspects of the present disclosure may comprise a rotor assembly; and a casing at least partially extending about the rotor assembly. The rotor assembly comprises a rotor disk including a circumferential array of slots; and an array of blades each having an axial root engaged in one of the slots of the rotor disk. Each of the array of blades comprises a plurality of blade segments, and the plurality of the blade segments are separate from one another at least partially in an axial direction forming radial seams between adjacent blade segments.

Some example methods of fabricating a turbomachinery blade according to at least some aspects of the present disclosure may comprise forming a plurality of blade segments which are separate from one another at least partially in an axial direction; and forming radial seams between adjacent blade segments.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION OF THE INVENTION

The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of the disclosure.

As used herein, the terms "axial" and "axially" refer to directions and orientations that extend substantially parallel to a centerline of an engine of a turbomachinery. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine.

The blades and methods described herein are applicable to turbomachinery including a fan section, a compression section and a turbine section. Since the sections undergo operational loads and/or a foreign object strike, which may cause release of the blades, the turbomachinery blade may be a blade in a fan section, in a compression section, or in a turbine section. The examples of the turbomachinery, are a turbofan engine, turboprop engines, turboshaft engines, turbojet engines, ground-based turbine engines, or any other turbine engine or machine that includes blades in the fan section, the compression section, or the turbine section.

Figure 1:
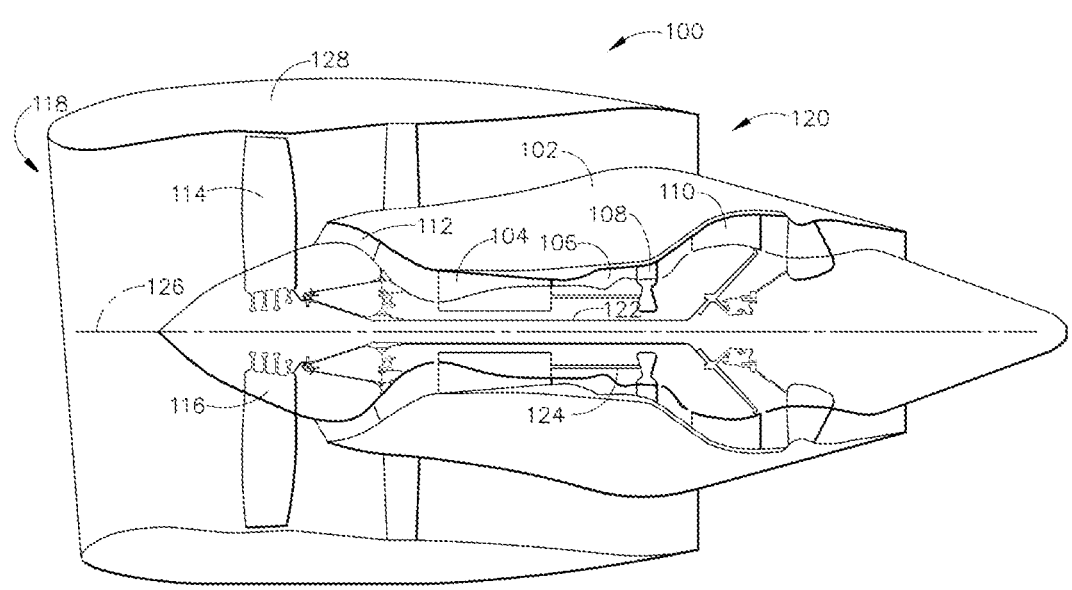
FIG. 1 is a schematic view of an exemplary turbofan engine.
Figure 2:
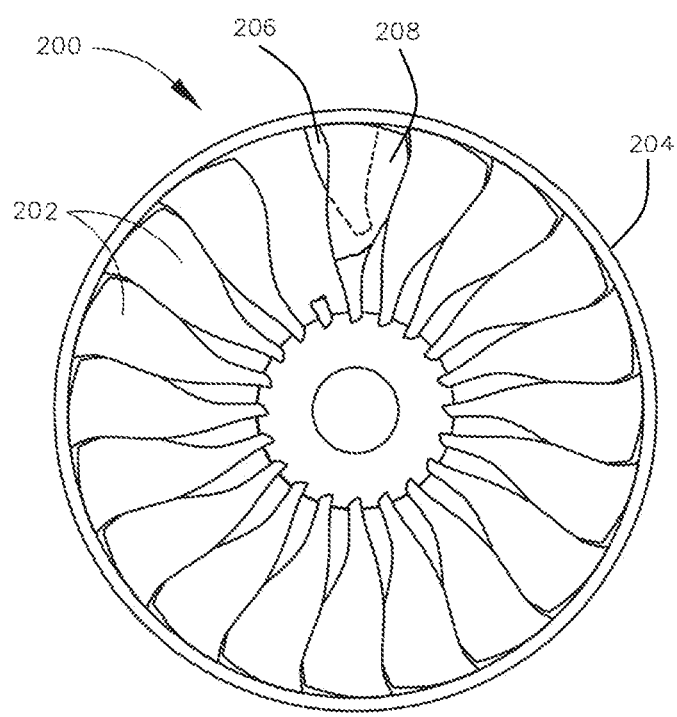
FIG. 2 is a front view of a fan assembly during release of fan blades.
Figure 3:
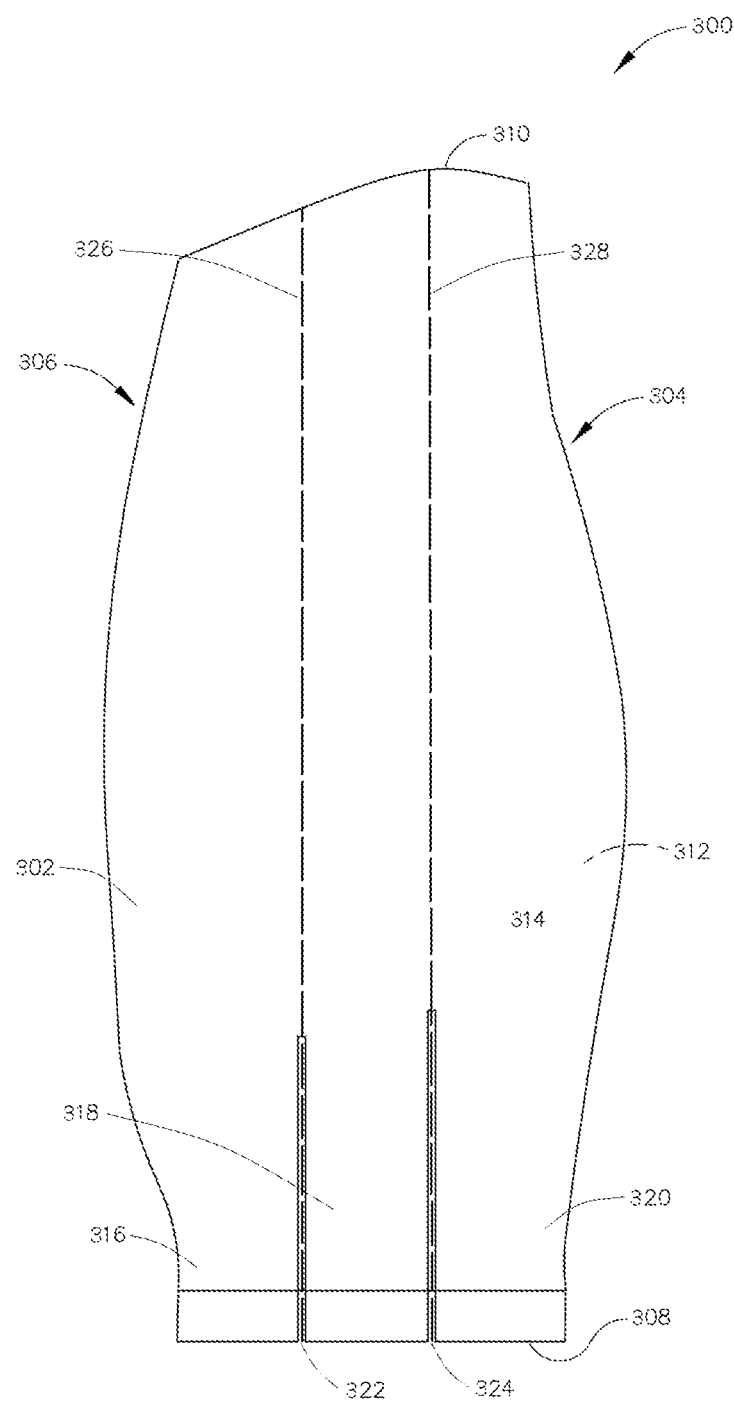
FIG. 3 is a side view of an exemplary turbomachinery blade comprising a plurality of blade segments which are separate from one another partially in an axial direction.

FIG. 3 is a side view of an exemplary turbomachinery blade 300. The turbomachinery blade 300 includes an airfoil 302 extending in a chordwise direction from a leading edge 304 to a trailing edge 306, and a root 308. The airfoil 302 extends radially outward in a spanwise direction from a root 308 to a tip 310. The airfoil 302 has a concave pressure side 312 and a convex suction side 314.

As illustrated in FIG. 3, the exemplary turbomachinery blade 300 comprises a plurality of blade segments 316, 318, 320 which are separate from one another at least partially in an axial direction, and radial seams 322, 324 are formed between the adjacent blade segments 316, 318, 320, which extend radially due to the separation of the adjacent blade segments 316, 318, 320 along the radial direction. Although there are three blade segments and two seams are shown in the FIG. 3, in some embodiments, the number of the blade segments or the number of the radial seams may vary (for example, the numbers may be two, three, four, or five, etc.) in case that the blade segments are capable to function under the normal operation of the turbomachinery blade.

In some embodiments, a turbomachinery blade is provided with a root comprising a plurality of root segments, and the plurality of the root segments are separate from one another partially or completely in an axial direction forming the radial seams between adjacent root segments; in an embodiment, each of the root segments may include a dovetail. In some embodiments, a turbomachinery blade is provided with an airfoil comprising a plurality of airfoil segments, and the plurality of the airfoil segments are separate from one another partially or completely in an axial direction forming the radial seams between adjacent airfoil segments. In still other embodiments, a turbomachinery blade is provided with a root comprising a plurality of root segments and an airfoil comprising a plurality of airfoil segments, and each of the plurality of the root segments corresponds to each of the plurality of the airfoil segments, whereby forming each of the blade segments; and the root segment and the corresponding airfoil segment thereof may be integral or non-integral depending on applications.

In some embodiments, the adjacent blade segments are separate or spaced apart from one another partially, that is, the adjacent blade segments are connected between one another partially. If the connections between the adjacent blade segments are robust enough to withstand the operational loads or a foreign object strike (for example, a bird strike), there may be no need to provide fasteners to fasten the adjacent blade segments, otherwise, additional fasteners are needed to connect the adjacent blade segments. As such, the turbomachinery blade 300 comprising a plurality of blade segments 316, 318, 320 is capable to function as a whole under the normal operation of the turbomachinery blade.

In some embodiments, the radial seams 322, 324 are designed in a radial shear direction defining "radial fault lines" where failure is supposed to happen along the radial direction in a turbomachinery, by utilizing the radial fault lines 326, 328 to design the blade segments 316, 318, 320 and the radial seams 322, 324, additional damage along the radial shear direction is avoided.

In some embodiments, a radial seam, some radial seams, or all the radial seams of the adjacent blade segments may be filled with fillers, whereby forming aerodynamic smoothness of a surface of the turbomachinery blade. As such, the fluid resistance caused by the blade segments and the radial seams over the surface of the turbomachinery blade are substantially reduced.

Figure 4:
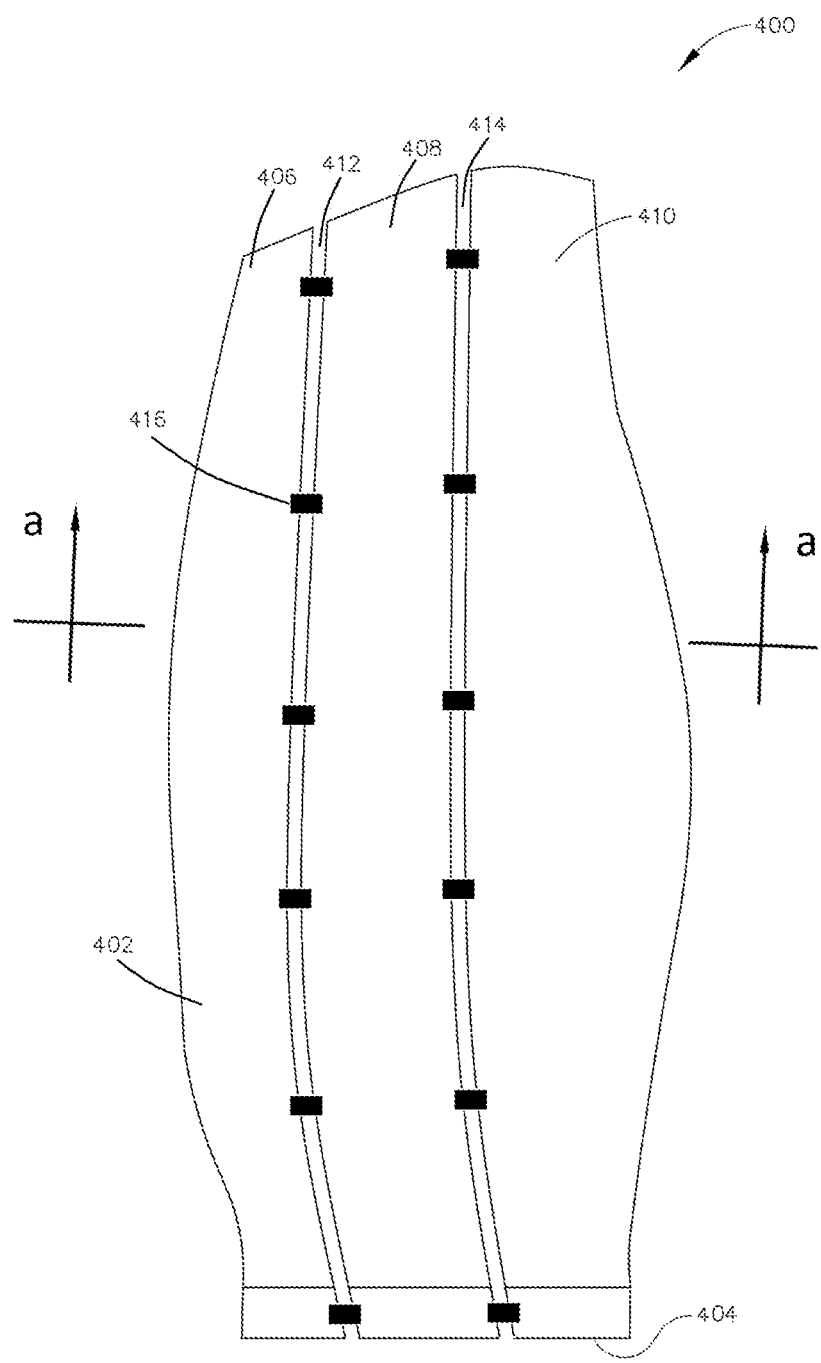
FIG. 4 is a side view of an exemplary turbomachinery blade with curve seams.

FIG. 4 is a side view of an exemplary turbomachinery blade 400 including an airfoil 402 and a root 404. The turbomachinery blade 400 comprises a plurality of blade segments 406, 408, 410 which are separate from one another completely in an axial direction, and radial seams 412, 414 are formed between the adjacent blade segments 406, 408, 410. As shown in FIG. 4, the radial seams 412, 414 between the adjacent blade segments 406, 408, 410 are curved. In some embodiments, an inner surface of a blade segment facing an adjacent blade segment thereof is an aerodynamic surface and the radial seams 412, 414 are of aerodynamic shapes, whereby facilitating fluids to flow over the inner surfaces along the seams and increase the flow efficiency.

Since the adjacent blade segments 406, 408, 410 are disconnected from one another completely in some embodiments, fasteners 416 (for example, clips) are provided to fasten and thereby holding the adjacent blade segments 406, 408, 410 together. As such, the turbomachinery blade 400 comprising a plurality of blade segments 406, 408, 410 is capable to function as a whole under the normal operation of the turbomachinery blade.

Although six fasteners 416 used for fastening the adjacent blade segments 406, 408, 410 are shown in the FIG. 4, in some embodiments, the number of the fasteners for fastening the adjacent blade segments 406, 408, 410 may vary (for example, the number may be one, two, three, four, five, six, or seven, etc.) in case that the turbomachinery blade 400 comprising a plurality of blade segments 406, 408, 410 is capable to function as a whole under the normal operation of the turbomachinery blade.

Figure 5:
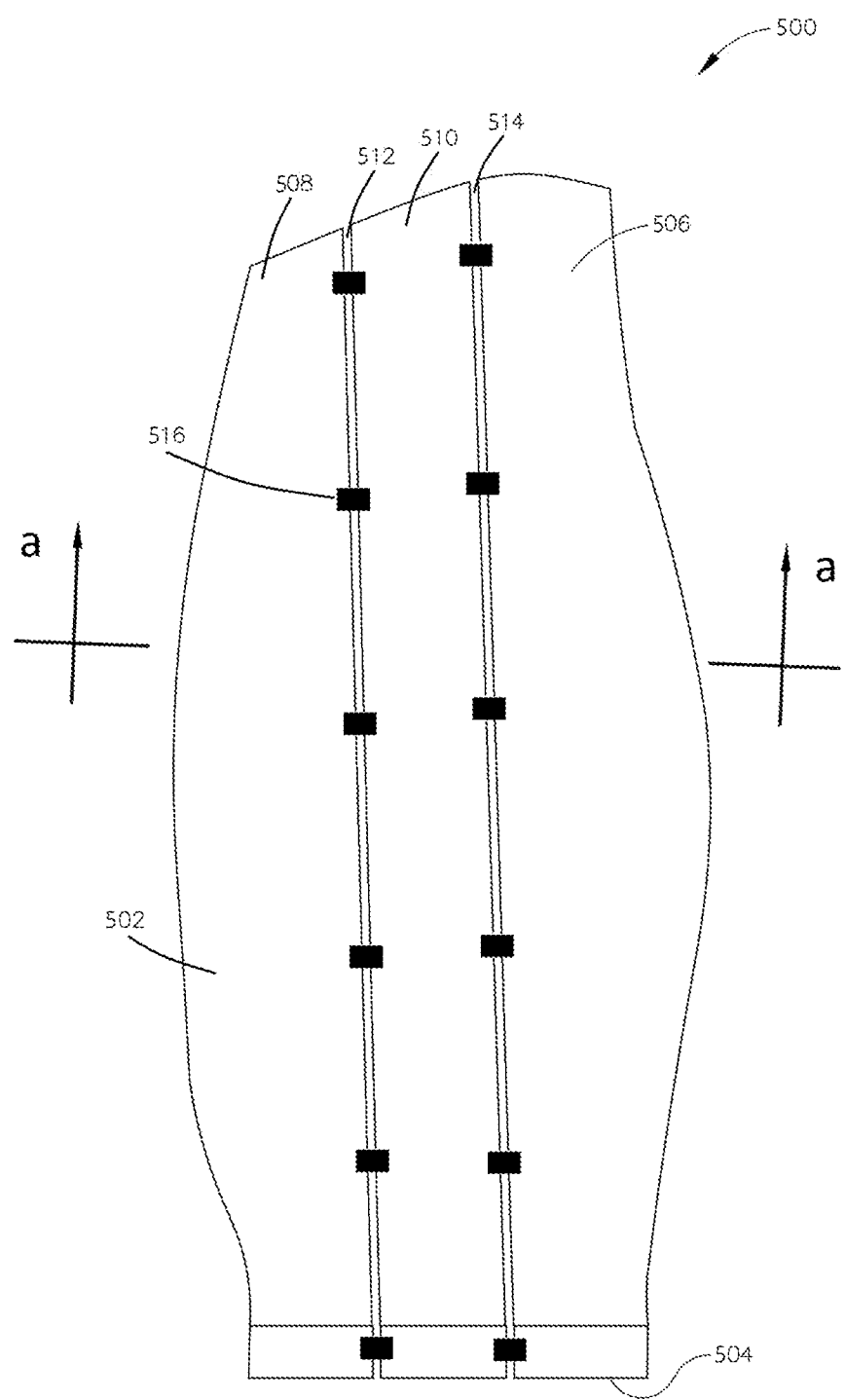
FIG. 5 is a side view of another exemplary turbomachinery blade with straight seams.

FIG. 5 is a side view of an alternative exemplary turbomachinery blade 500 including an airfoil 502 and a root 504. The turbomachinery blade 500 comprises a plurality of blade segments 506, 508, 510 which are separate from one another completely in an axial direction, and radial seams 512, 514 are formed between the adjacent blade segments 506, 508, 510, with fasteners 516 fastening and thereby holding the adjacent blade segments 506, 508, 510 together. The turbomachinery blade 500 is similar to the embodiments of turbomachinery blade 400 illustrated in FIG. 4, both in construction and functionality, with one notable distinction, that is, the radial seams 512, 514 between the adjacent airfoil segments 506, 508, 510 are straight, which is easy for machining the blade segments 506, 508, 510, thereby saving time and costs for fabrication. For balancing the flow efficiency and time/cost saving for fabrication, in some embodiments, at least one of the radial seams may be curved and the remaining radial seam(s) may be straight.

Figure 6:
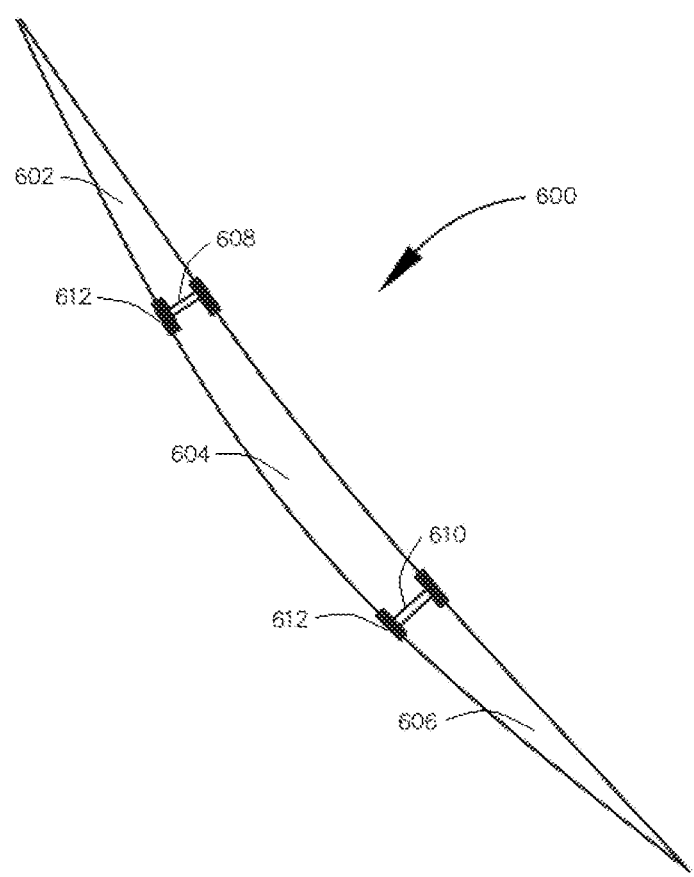
FIG. 6 is a cross-sectional view of the exemplary turbomachinery blade shown in FIG. 4 or 5 taken along line a-a, with fasteners.

FIG. 6 is a cross-sectional view of the exemplary turbomachinery blade 600 shown in FIG. 4 or 5 taken along line a-a. As schematically illustrated, the turbomachinery blade 600 comprises three blade segments 602, 604, 606, the three blade segments are spaced apart from one another along the axial direction forming radial seams 608, 610 between adjacent blade segments 602, 604, 606, and fasteners 612 fasten the adjacent blade segments 602, 604, 606. The fasteners 612 hold blade segments at outer aerodynamic surface together and carries aero loads. As such, the separate blade segments are capable to function as a whole under the normal operation of the turbomachinery blade.

Figure 7:
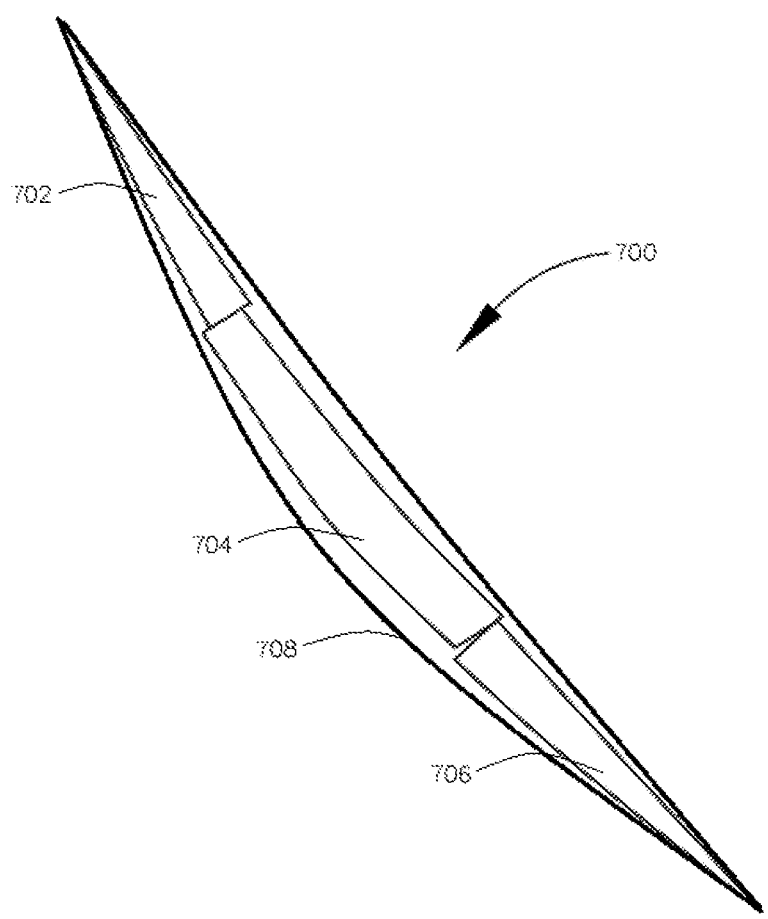
FIG. 7 is a cross-sectional view of the exemplary turbomachinery blade shown in FIG. 4 or 5 taken along line a-a, with an outer layer.

FIG. 7 is a cross-sectional view of the exemplary turbomachinery blade 700 shown in FIG. 4 or 5 taken along line a-a, with an outer layer. As schematically illustrated, the turbomachinery blade 700 comprises three airfoil segments 702, 704, 706. In some embodiments, an outer layer 708 is provided, which may hold the airfoil segments 702, 704, 706 under normal operation of the turbomachinery blade 700. In an embodiment, the outer layer 708 is capable to hold the airfoil segments 702, 704, 706 to function as a whole under the normal operation of the turbomachinery blade, therefore, there is no need to provide fasteners to connect the adjacent blade segments.

In some embodiments, the outer layer 708 is made from non-metallic type made of a material containing a fiber such as a carbonaceous, silica, metal, metal oxide, or ceramic fiber embedded in a resin material such as Epoxy, PMR15, BMI, PEEU. In other embodiments, the outer layer 708 is thin for reducing the weight of the turbomachinery blade.

Figure 8:
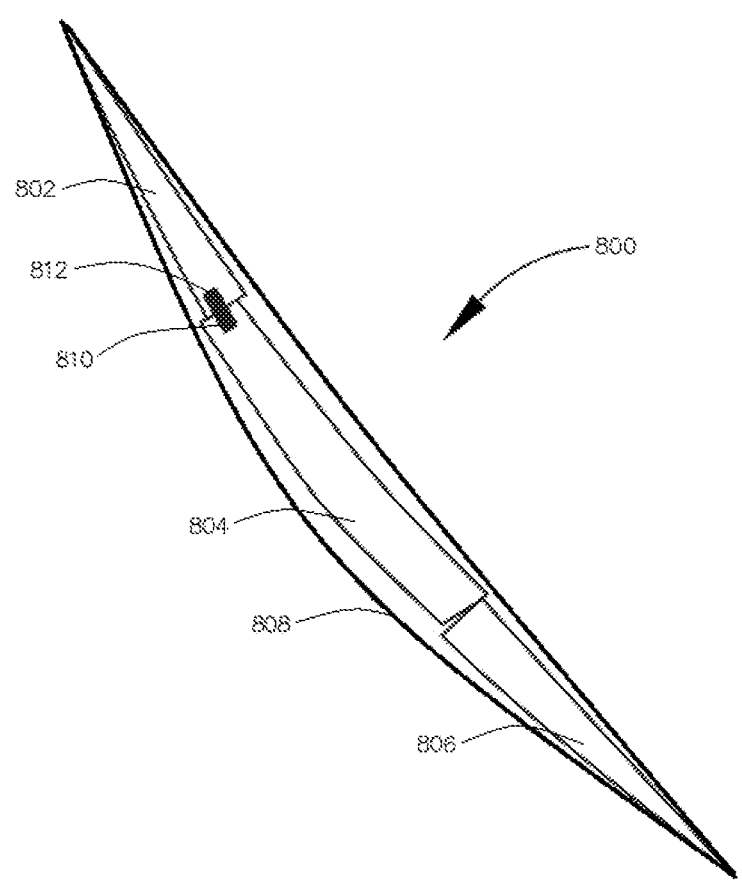
FIG. 8 is a cross-sectional view of the exemplary turbomachinery blade shown in FIG. 4 or 5 taken along line a-a, with a groove, a tongue and an outer layer.

FIG. 8 is a cross-sectional view of the exemplary turbomachinery blade 800 shown in FIG. 4 or 5 taken along line a-a. In some embodiments, the turbomachinery blade 800 comprises three airfoil segments 802, 804, 806 and an outer layer 808, which is similar to the embodiments of turbomachinery blade 700 illustrated in FIG. 7, both in construction and functionality, with one notable distinction, that is, the turbomachinery blade 800 comprises at least one tongue 810 and at least one groove 812 formed between adjacent airfoil segments 802, 804, 806, the groove 812 consists of two recesses each extending along the adjacent airfoil segments 802, 804, 806 in a radial direction with a distance, and the groove 812 is sized to accommodate the tongue 810. As such, the groove 812 and the tongue 810, together with the outer layer 808, hold the airfoil segments 802, 804, 806 more tightly under normal operation of the turbomachinery blade 800.

As seen in FIG. 8, the tongue 810 in the corresponding groove 812 transmits normal aero loads through the groove in the middle of the blade segment in a tangential direction of the turbomachinery blade, while the outer layer 808 holds the tongue 810 and the airfoil segments 802, 804, 806 together and provides surfaces with aero smoothness. With such configuration, the outer layer 808 may not carry all aero loads under normal operation. The number of the grooves and the tongues may vary (for example, the number may be one, two, three, four, or five, etc.) in case that the tongues in the corresponding grooves are capable to transmit normal aero loads through the groove effectively under the normal operation of the turbomachinery blade.

Figure 9:
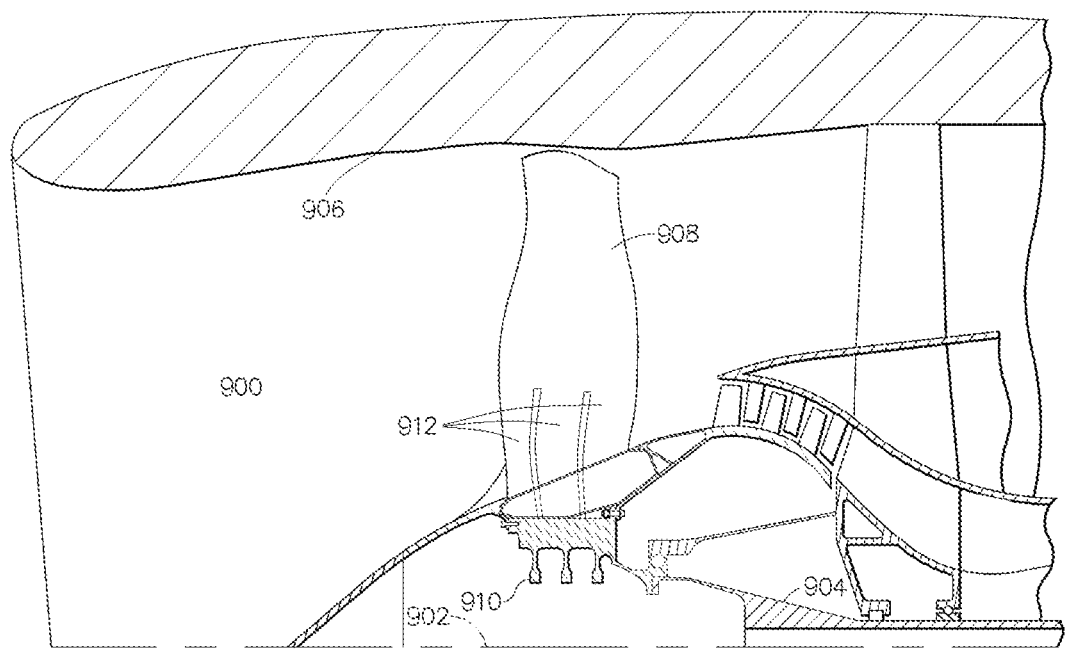
FIG. 9 is a schematic side view of a fan assembly of a turbomachinery incorporating the exemplary turbomachinery blades.

FIG. 9 is a schematic side view of a fan assembly 900 of a turbomachinery incorporating the exemplary turbomachinery blades as fan blades. As shown in the FIG. 9, a fan assembly 900 is rotated about a central longitudinal axis 902 by a fan shaft 904 powered by a low-pressure turbine (not shown). The fan assembly 900 includes a fan casing 906 and a plurality of fan blades 908 spaced apart from one another circumferentially and extending radially outwardly from a rotor disk 910. Each of the plurality of the fan blades comprises a plurality of blade segments 912, and the plurality of the blade segments 912 are separate from one another at least partially in an axial direction forming radial seams between adjacent blade segments 912.

Figure 10:
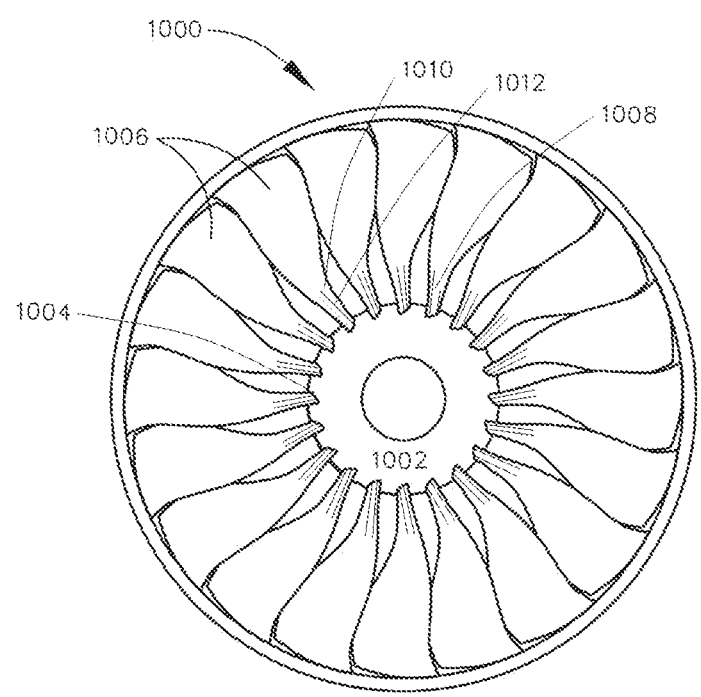
FIG. 10 is a front view of an exemplary rotor assembly.

FIG. 10 is a front view of an exemplary rotor assembly 1000. The rotor assembly 1000 comprises a rotor disk 1002 including a circumferential array of slots 1004 and an array of blades, each blade 1006 has an axial root 1008 engaged in one of the slots 1004 of the rotor disk 1002, and each of the array of the blades comprises a plurality of blade segments 1010, and the plurality of the blade segments 1010 are separate from one another at least partially in an axial direction forming radial seams 1012 between adjacent blade segments 1010. Each of the array of the blades may be a turbomachinery blade described herein.

Some exemplary embodiments disclose a turbomachinery, the turbomachinery comprises a rotor assembly and a casing at least partially extending about the rotor assembly; the rotor assembly comprises a rotor disk including an circumferential array of slots and an array of blades, each blade has an axial root engaged in one of the slots of the rotor disk, and each of the array of the blades comprises a plurality of blade segments, and the plurality of the blade segments are separate from one another at least partially in an axial direction forming radial seams between adjacent blade segments. Each of the array of the blades may be a turbomachinery blade described herein.

Figure 11:
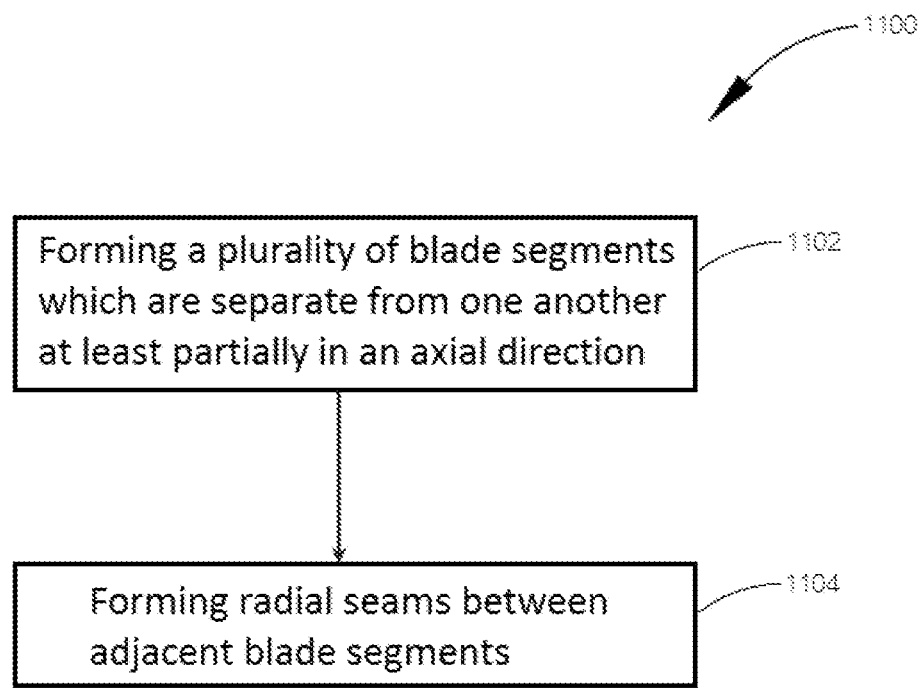
FIG. 11 is a flowchart illustrating an example method of fabricating a turbomachinery blade.

FIG. 11 is a flowchart illustrating an example method 1100 of fabricating a turbomachinery blade in accordance with at least some aspects of the present disclosure.

Method 1100 may include an operation 1102, which may include forming a plurality of blade segments which are separate from one another at least partially in an axial direction. The operation 1102 may comprise forming a plurality of root segments which are separate from one another at least partially in an axial direction in a root of the turbomachinery blade. The operation 1102 may comprise forming a plurality of airfoil segments which are separate from one another at least partially in an axial direction in an airfoil of the turbomachinery blade. The operation 1102 may comprise forming a plurality of root segments and forming a plurality of airfoil segments, and each of the plurality of the root segments corresponds to each of the plurality of the airfoil segments, whereby forming each of the plurality of the blade segments. The operation 1102 may comprise forming at least one root segment and at least one corresponding airfoil segment in an integral manner. The operation 1102 may comprise using fasteners to hold the at least one of the plurality of the airfoil segment and the adjacent airfoil segment thereof together.

Operation 1102 is followed by an operation 1104, which may include forming radial seams between adjacent blade segments. The operation 1104 may comprise forming the radial seams between adjacent root segments. The operation 1104 may comprise forming the radial seams between adjacent airfoil segments.

The method 1100 may comprise forming an outer layer with or without a tongue and a groove between adjacent airfoil segments to hold the airfoil segments together under normal operation of the turbomachinery blade. The method 1100 may comprise filling the radial seams with a filler to form aerodynamic smoothness of a surface of the turbomachinery blade.

During an FBO event or an FBO test, in contrast to prior solutions which are silent on reducing the FBO amount, the turbomachinery blade described herein (for example, a turbomachinery blade provided with a root comprising a plurality of root segments, and the plurality of the root segments are separate from one another partially or completely in an axial direction forming the radial seams between adjacent root segments) reduces the unbalance substantially in terms of the released blade and the damaged trailing blades, due to the turbomachinery blade described herein is pre-cutted, among others. That is, in one aspect, only one of blade segments (in particular, only one of root segments, or only one of airfoil segments) will be separated; in another aspect, the release of one blade segment with a narrower chord than a chord of a normal turbomachinery blade reduces the possibility of impacting the trailing blade segments and trailing blades; in still another aspect, the release of one blade segment with a narrower chord than a chord of a normal turbomachinery blade produces less damage on the trailing blade segments and the trailing blades.

Further, although a narrow-chord turbomachinery blade has much lower FBO, conventional technologies do not tie the "narrow-chord turbomachinery blade" to a FBO event or a FBO test, and the conventional technologies do not envisage possible tie-ups between two aspects, where one aspect involves a narrow-chord turbomachinery blade with much lower FBO, and another aspect involves a wide-chord turbomachinery blade with much higher operational efficiency. While some embodiments of the present disclosure embody the tie-ups between the two aspects, for example, a turbomachinery blade is provided with a root comprising a plurality of root segments which are separate from one another partially or completely in an axial direction forming the radial seams between adjacent root segments, thereby leveraging much lower FBO demonstrated by a narrow-chord turbomachinery blade segment and higher operational performance demonstrated by a wide-chord turbomachinery blade simultaneously.

The turbomachinery blade described herein (for example, a turbomachinery blade provided with a root comprising a plurality of root segments, and the plurality of the root segments are separate from one another partially or completely in an axial direction forming the radial seams between adjacent root segments) reduces blade-out loads, and most of the blades and blade segments are kept in place, resulting in lower overall design loads to the engine. Therefore, the weight of the turbomachinery can be reduced.

Currently, two certification tests are performed, one certification test is the FBO test, and another certification test is a large bird ingestion test which is required under the auspices of the FARs part 33 section 76 of "Bird ingestion". The FBO test is usually performed on a full engine, while the large bird ingestion test is often performed on a fan rig. The turbomachinery blade described herein generates similar to or even lower unbalance than the large bird ingestion test. Therefore, in one aspect, the overall design load to the turbomachinery is reduced; in another aspect, it would be practical to perform a full engine large bird ingestion test in relatively lower unbalance scenarios to satisfy requirements of the two certification tests rather than perform the two certification tests separately.

A conventional design may utilize a load reduction device (LRD) in a form of a fuse zone on a bearing support of a blade, and the fuse zone is configured to fail before the surrounding structure. The fuse zone does not actually reduce the size of FBO. The turbomachinery blade described herein reduces the unbalance of a rotor assembly substantially. Thus, there is no need to resort to a LRD to avoid operational loads or a load caused by a foreign object strike going beyond the predetermined value. Eliminating the LRD would not only reduce the weight and cost of the load reduction device itself, but also reduce overall drag by decreasing the diameter of the fan casing, and the reduced weight and drag means better fuel burn.

During a FBO event or a FBO test, a crack is generated in a turbomachinery blade, for example, in an airfoil or in a root due to operational loads or a foreign object strike, the crack then propagates across the turbomachinery blade under operation, causing severe damage on the turbomachinery blade and trailing blades thereof. The present turbomachinery blade comprises a plurality of blade segments that are separate from one another at least partially in an axial direction forming radial seams between adjacent blade segments. As such, a crack cannot propagate across adjacent blade segments, and the crack growth across the turbomachinery blade and the resulting severe damage on the turbomachinery blade and trailing blades thereof are eliminated.

The foregoing description of the embodiments of the invention is provided for illustrative purposes only and is not intended to limit the scope of the invention as defined in the appended claims.

What is claimed is:

1. A turbomachinery blade comprising:
a root;
an airfoil extending outwardly in a radial direction from the root, and having an airfoil tip;
wherein the airfoil is formed as a plurality of airfoil segments,
wherein the plurality of airfoil segments are separate from one another at least partially in an axial direction forming airfoil radial seams between adjacent airfoil segments of the plurality of airfoil segments,
wherein the airfoil radial seams extend from a radial end of the airfoil tip to the root,
wherein the turbomachinery blade further comprises an outer layer defining an outer surface of the turbomachinery blade disposed at least at a radially central portion of the turbomachinery blade that is closer to a radial center between the airfoil tip and the root than the airfoil tip and the root, wherein the outer layer is non-metallic type made of a material comprising a fiber, and wherein the outer layer holds the airfoil segments, and axially-facing surfaces of the outer layer are configured to be disposed in a flowpath of the turbomachinery, under normal operation of the turbomachinery blade.

2. The turbomachinery blade of claim 1, wherein at least one of the airfoil radial seams between the adjacent airfoil segments is curved.

3. The turbomachinery blade of claim 1,
wherein the root comprises a plurality of root segments, and
wherein the plurality of root segments are separate from one another at least partially in an axial direction forming root radial seams between adjacent root segments.

4. The turbomachinery blade of claim 3, wherein each of the plurality of root segments comprises a dovetail.

5. The turbomachinery blade of claim 1, wherein the adjacent airfoil segments of the plurality of airfoil segments are held together using fasteners.

6. The turbomachinery blade of claim 1, further comprising:
at least one groove and at least one tongue disposed between adjacent airfoil segments,
wherein the at least one groove, the at least one tongue and the outer layer hold the airfoil segments under normal operation of the turbomachinery blade.

7. The turbomachinery blade of claim 1,
wherein the root comprises a plurality of root segments, and
wherein each of the plurality of root segments corresponds to each of the plurality of airfoil segments, respectively.

8. A fan assembly comprising:
a fan casing, and
a plurality of fan blades spaced apart from one another circumferentially,
wherein each of the plurality of fan blades comprises:
a root;
an airfoil extending outwardly in a radial direction from the root, and having an airfoil tip;
wherein the airfoil is formed as a plurality of airfoil segments,
wherein the plurality of airfoil segments are separate from one another at least partially in an axial direction forming airfoil radial seams between adjacent airfoil segments of the plurality of airfoil segments, and
wherein the airfoil radial seams extend from a radial end of the airfoil tip to the root,
wherein the fan blade further comprises an outer layer defining an outer surface of the fan blade disposed at least at a radially central portion of the fan blade that is closer to a radial center between the airfoil tip and the root than the airfoil tip and the root, wherein the outer layer is non-metallic type made of a material comprising a fiber, and wherein the outer layer holds the airfoil segments, and axially-facing surfaces of the outer layer are configured to be disposed in a flowpath of the fan, under normal operation of the fan blade.

9. The fan assembly of claim 8,
wherein the root comprises a plurality of root segments, and
wherein the plurality of root segments are separate from one another at least partially in an axial direction forming root radial seams between adjacent root segments.

10. The fan assembly of claim 8, wherein the adjacent airfoil segments of the plurality of airfoil segments are held together using fasteners.

11. A method of fabricating a fan blade comprising:
forming a root;
forming an airfoil that extends outwardly in a radial direction from the root and that has an airfoil tip, wherein the airfoil is formed as a plurality of airfoil segments to be separate from one another at least partially in an axial direction; and
forming airfoil radial seams between adjacent airfoil segments of the plurality of airfoil segments,
wherein the airfoil radial seams extend from a radial end of the airfoil tip to the root,
wherein the method further comprises forming an outer layer defining an outer surface of the turbomachinery blade disposed at least at a radially central portion of the turbomachinery blade that is closer to a radial center between the airfoil tip and the root than the airfoil tip and the root,
wherein the outer layer is non-metallic type made of a material comprising a fiber, and
wherein the outer layer holds the airfoil segments, and axially-facing surfaces of the outer layer are configured to be disposed in a flowpath of the turbomachinery, under normal operation of the turbomachinery blade.

12. The method of claim 11, wherein the forming the root comprises:
forming a plurality of root segments which are separate from one another at least partially in an axial direction, and
forming root radial seams between adjacent root segments of the plurality of root segments.

13. The method of claim 11, further comprising:
fastening the adjacent airfoil segments of the plurality of airfoil segment and the corresponding adjacent airfoil segment thereof together.

* * * * *